United States Patent [19]

Herman

[11] Patent Number: 5,108,132

[45] Date of Patent: Apr. 28, 1992

[54] SPLIT SPACER FOR FLANGE FITTINGS

[76] Inventor: Fred L. Herman, P.O. Box 2106, Alvin, Tex. 77512-2106

[21] Appl. No.: 564,724

[22] Filed: Aug. 6, 1990

[51] Int. Cl.[5] .............................................. F16L 25/00
[52] U.S. Cl. ..................................... 285/12; 285/9.1; 285/158
[58] Field of Search ................. 285/12, 9.1, 415, 158

[56] References Cited

U.S. PATENT DOCUMENTS

| 3,076,948 | 2/1963 | Misner | 285/415 X |
| 4,426,103 | 1/1984 | Sundholm | 285/12 |
| 4,536,835 | 9/1985 | Sundholm | 285/12 |

FOREIGN PATENT DOCUMENTS 2007791  5/1979  United Kingdom .................. 285/12

*Primary Examiner*—Dave W. Arola
*Attorney, Agent, or Firm*—Kenneth A. Roddy

[57] ABSTRACT

A split spacer for flange fittings is disclosed which is in the form of a flat disc-shaped ring of predetermined thickness bisected along its diameter to form two separate identical semi-circular segments. In one embodiment on O-ring is installed in a groove on the circumference of the spacer which allows the spacer segments to be manually pulled part in opposed direction for installation on a coupling flange and when released, the segments assume a complete circular configuration. In another embodiment, the two segments are magnetized such that they are held the circular configuration by magnetic attraction. The segments are positioned in their engaged ring configuration on the bearing surface of a flange having one thickness such that the combined thickness will engage the bearing shoulder of a flange connector configured to normally connect flanges of a different thickness. The spacer is particularly useful in adapting a standard SAE approved hose coupling to fit a special, or non-standard, split flange of the type used on earthmoving machinery and the like.

20 Claims, 1 Drawing Sheet

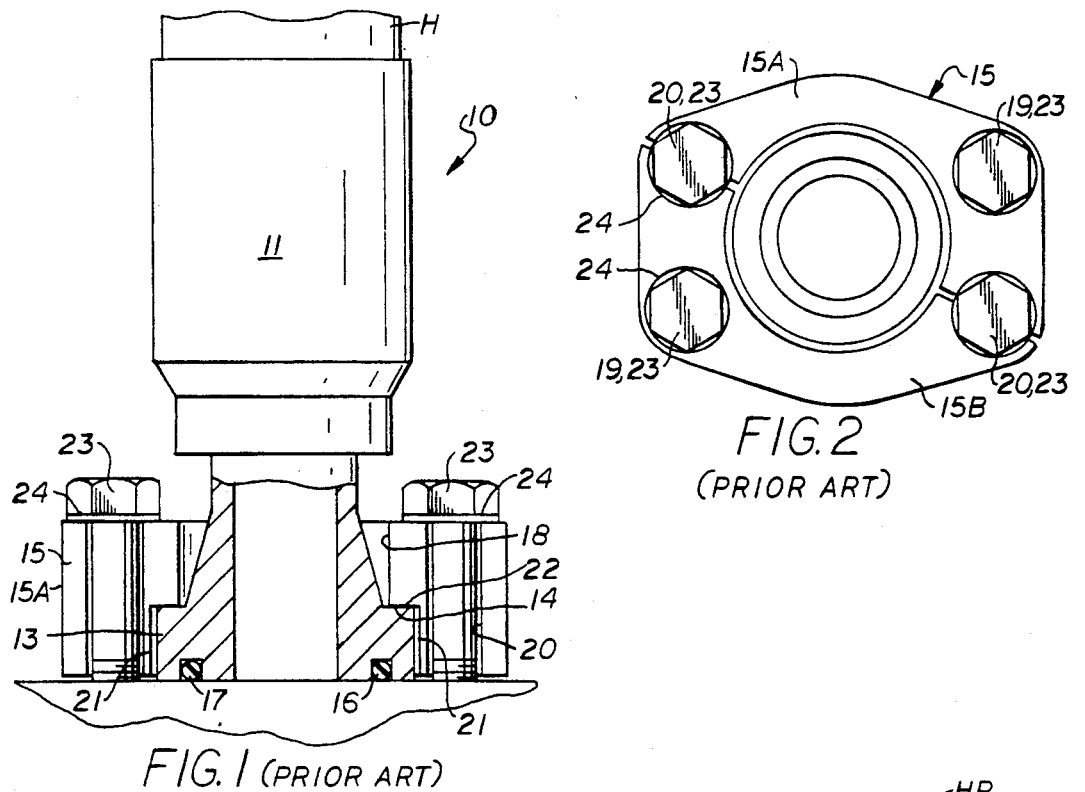
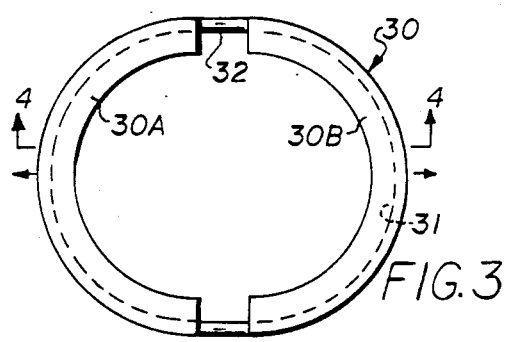
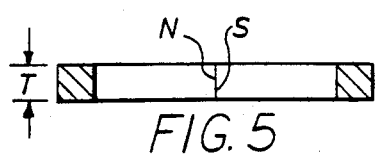
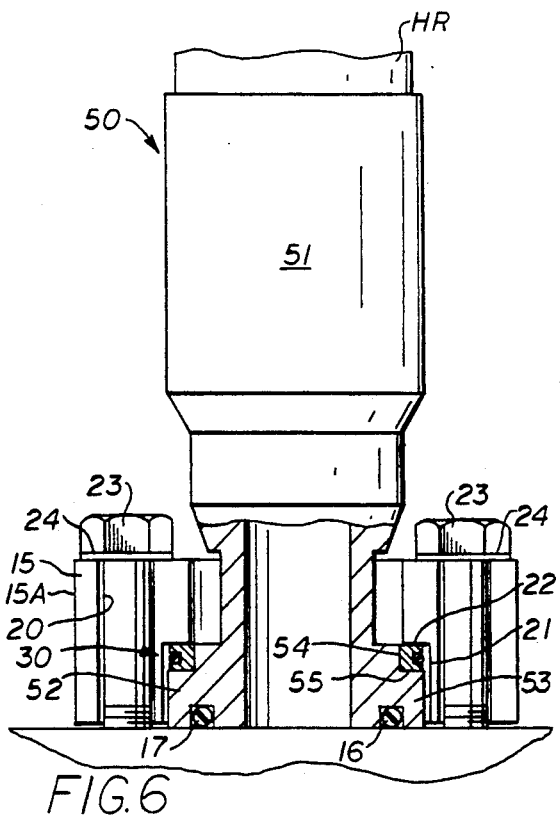

SPLIT SPACER FOR FLANGE FITTINGS

BACKGROUND OF THE INVENTION

1. Field of the Invention

This invention relates generally to flange fittings, and more particularly to a split spacer for flange fittings which will adapt a standard SAE approved hose coupling to fit a special, or non-standard, split flange of the type used on earthmoving machinery and the like.

2. Brief Description of the Prior Art

Split flange connections are often used on the hydraulic systems of heavy equipment, such as earthmoving machinery, to join couplings to blocks, manifolds, etc. for establishing fluid communication where it is impossible or impractical to use continuous circular flanges. Such split flange connectors are disclose in U.S. Pat. No. 2,681,817 and U.S. Pat. No. 3,600,012.

Some manufacturers of earthmoving machinery have designed their split flange coupling components such that there is no interchangeability between their fittings and standard SAE hose fittings. For example, the manufacturer may provide a hose coupling with a radial flange having a thickness greater than the thickness of the standard SAE fitting in the hose connector industry or the coupling may have a non-standard flange and/or bolting arrangement. In other words, if a person needs to replace a hose on the machinery, he must order a hose coupling provided by the equipment manufacturer.

In order to service the equipment operator, hose distributors and/or manufacturers must purchase expensive machinery to manufacture the coupling and flanges according the equipment manufacturer's specifications, or stock a large inventory of expensive non-standard fittings. While at the same time, he may have a full inventory of standard SAE couplings and fittings which are less expensive and readily available.

If an equipment operator needs a replacement hose, he must use the more expensive non-standard fittings which are often not readily available and have to be ordered. The hose manufacturer an/or distributor may sell him an off-the-shelf mating flange kit However, the if he has a hose coupling from the equipment manufacturer, the flange in the kit will not fit the coupling and/or bolting arrangement, or if he has a standard SAE coupling on the hose, it will not fit the flange on the machinery.

SUMMARY OF THE INVENTION

It is therefore an object of the present invention to provide a spacer for flange fittings which will allow the use of a standard SAE approved hose coupling with a special, or nonstandard, split flange of the type used on earthmoving machinery and the like.

It is another object of this invention is to provide a spacer for flanged fittings which will eliminate the need for hose manufacturers and/or distributors to purchase and operate expensive machining equipment to produce special hose couplings and flanges.

Another object of this invention to provide a spacer for flange fittings which is comprised of two segments so that is can be easily and quickly installed on couplings where it is impossible or impractical to use continuous circular flanges.

Another object of this invention is to provide a spacer for flange fittings comprised of two segments which may be manually pulled part and when released will assume a complete circular configuration.

A further object of this invention is to provide a repair kit for flanged fittings which contains a set of parts which will enable an equipment operator to easily and quickly install a new hose onto his machinery in the field without the need for special parts or tools.

A still further object of this invention is to provide a spacer which is simple in construction, economical to manufacture, and rugged and reliable in use.

Other objects of the invention will be apparent from time to time throughout the specification and claims as hereinafter related.

The above noted objects and other objects of the invention are accomplished by a split spacer for flange fittings in the form of a flat disc-shaped ring of predetermined thickness bisected along its diameter to form two separate identical semi-circular segments In one embodiment an O-ring is installed in a groove on the circumference of the spacer which allows the spacer segments to be manually pulled part in opposed direction for installation on a coupling flange and when released, the segments assume a complete circular configuration. In another embodiment, the two segments are magnetized such that they are held the circular configuration by magnetic attraction. The segments are positioned in their engaged ring configuration on the bearing surface of a flange having one thickness such that the combined thickness will engage the bearing shoulder of a flange connector configured to normally connect flanges of a different thickness. The spacer is particularly useful in adapting a standard SAE approved hose coupling to fit a special, or non-standard, split flange of the type used on earthmoving machinery and the like.

BRIEF DESCRIPTION OF THE DRAWINGS

FIG. 1 is a longitudinal cross section through a typical hose couplings and split flange assembly of the prior art.

FIG. 2 is a top plan view of the split flange of the prior art.

FIG. 3 is a top plan view of one embodiment of a split spacer in accordance with the present invention with the segments pulled apart.

FIG. 4 is a cross section through the split spacer of FIG. 3 taken along line 4—4 with the segments held together.

FIG. 5 is a cross section through another embodiment of the split spacer in accordance with the present invention which utilizes magnetic attraction to maintain the segments together FIG. 6 is a longitudinal cross section through a hose couplings and split flange assembly utilizing a standard coupling and the spacer of FIG. 3.

DESCRIPTION OF THE PREFERRED EMBODIMENT

Referring to the drawings by numerals of reference, there is shown in FIGS. 1 and 2, a typical hose coupling and flange assembly 10 of the prior art utilizing a split flange connection. Split flange connections are often used on the hydraulic systems of heavy equipment, such as earthmoving machinery, to join couplings to blocks, manifolds, etc. for establishing fluid communication where it is impossible or impractical to use continuous circular flanges A typical assembly comprises a coupling 11 secured at one end to a hose H and a head at the other end which includes a radially extending flange 13

The radially extending flange 13 forms a shoulder 14 which is a circular bearing surface engaged by a split flange connector 15 to urge it tightly against the surface to which the coupling 11 is secured. The face of the coupling flange 13 is provided with an O-ring groove 16 in which an O-ring 17 is received for effecting a fluid seal.

Generally, the split flange 15 is a bisected disc-shaped circular or oval configuration having a central aperture 18 for receiving the head of the coupling 11 and bisected to form two identical arcuate segments 15A and 15B. In the example illustrated, each segment has a central bolt hole 19 and two half holes 20 which are located at opposite ends so that four bolt holes are formed when the segments are assembled together. Each of the arcuate segments has a semi-circular recess 21 extending upwardly a distance from its bottom surface to define a bearing shoulder 22 which engages the bearing surface 14 of the coupling radial flange 13. Bolts 23 having washers 24 beneath their heads are installed in the bolt holes 19 and 20.

Some manufacturers of earthmoving machinery have designed their split flange coupling components such that there is no interchangeability between their fittings and standard SAE hose fittings. For example, the manufacturer may provide a hose coupling with a radial flange having a thickness greater than the thickness of the standard SAE fitting in the hose connector industry or the coupling may have a non-standard flange and/or bolting arrangement. In other words, if a person needs to replace a hose on the machinery, he must order a hose coupling provided by the equipment manufacturer.

The present invention allows one to use a standard SAE approved hose coupling with the special, or non-standard, split flange of the equipment manufacturer.

Referring now to FIGS. 3 and 4, there is shown one preferred embodiment of the split spacer 30 in accordance with the present invention. The split spacer 30 is a flat disc-shaped ring of predetermined thickness T. An O-ring groove 31 is formed on the circumference of the spacer 30. The spacer 30 is bisected along its diameter to form two separate identical semi-circular segments 30A and 30B. The spacer 30 can be made as a unitary structure and after the inside and outside diameters and the O-ring groove 31 have been formed, it can be cut along its diameter to form the two segments 30A and 30B.

The two segments 30A and 30B are placed together end-to-end to form a complete circle and an elastic O-ring 32 is installed in the groove 31. The inside diameter of the O-ring 32 is smaller in diameter than the inner surface of the groove 31 such that the segments 30A and 30B are normally maintained together by the resilient pressure of the ring 32, but may be manually pulled part in opposed direction (FIG. 3). When released, the segments 30A and 30B will assume the complete circular configuration (FIG. 4).

Another embodiment of the split spacer is shown in FIG. 5. The split spacer 40 is a flat disc-shaped ring of predetermined thickness T The spacer 40 is bisected along its diameter to form two separate identical semi-circular segments 40A and 40B. The spacer 40 can be made as a unitary structure and after the inside and outside diameters have been formed, it can be cut along its diameter to form the two segments 40A and 40B.

The two segments 40A and 40B are magnetized by conventional methods such that their ends can be placed with the north pole N of one segment adjacent the south pole S of the opposed segment Thus, segments 40A and 40B are normally maintained together by magnetic attraction, but may be manually pulled part in opposed direction. When released, the segments 40A and 40B will assume the complete circular configuration.

Referring now to FIG. 6, there is shown a hose coupling and split flange assembly 50 utilizing a standard SAE approved hose coupling 51 with the special, or non-standard, split flange 15 of the equipment manufacturer, as previously described with reference to FIGS. 1 and 2.

The SAE approved coupling 51 has a slightly different radial flange 52. The radial flange 52 has a bottom portion 53 which is substantially the same diameter as the non-standard flange 13 and is provided with the same O-ring groove 16, but has a reduced diameter neck portion 54 just above the bottom portion 53 to form a circular shoulder or bearing surface 55 surrounding the reduced diameter portion Thus, the bottom portion 53 of the SAE flange 52 is not as thick as the previously described flange 13.

The hose coupling 51 is usually installed on the replacement hose HR at the location at which the hose is purchased, and the spacer 30 or 40 would be supplied with the replacement hose and coupling for installation in the field or location of the earthmoving machinery.

The spacer 30 is installed by pulling the segments 30A and 30B apart, sliding them over the bottom portion of the flange 52, and then releasing them to assume their circular configuration. If the magnetized spacer embodiment 40 is used, the installer merely positions the segments such that the north pole N of one segment is adjacent the south pole S of the opposed segment, and releases them so they are held together in the circular configuration by magnetic attraction.

In the circular configuration, the spacer 30 (or 40) will fit onto the circular shoulder or bearing surface 55, and surround the reduced diameter portion 54. The outer diameter of the spacer 40 or 40 is substantially the same as the diameter of the flange bottom portion and the spacer thickness T is such that the combined thickness of the flange bottom portion 53 and the spacer will be substantially the same as the non-standard flange 13. The top surface of the spacer then becomes the bearing surface engaged by the shoulder 22 of the non-standard split flange 15.

The O-ring 17 is installed and the coupling 51 is properly positioned on the fluid port of the machinery. The flange segments 30A and 30B are then assembled around the coupling/spacer assembly and the bolts 23 and washers 24 are
installed in the conventional manner.

The spacer may be sold in a repair kit for flanged fittings which may also contain an O-ring for the spacer and one for the coupling flange along with a set of flanges, bolts, and washers which would enable an equipment operator to easily and quickly install a new hose onto his machinery in the field. The spacer according the present invention will eliminate the need for hose manufacturers and/or distributors to purchase and operate expensive machining equipment to produce special hose couplings and flanges.

Although the spacer described herein has been described for use in adapting a standard SAE approved hose coupling to fit a special, or non-standard, split flange of the type used on earthmoving machinery and the like, it should be understood that it may be used in other types of flange connectors.

While this invention has been described fully and completely with special emphasis upon a preferred embodiment, it should be understood that within the scope of the appended claims the invention may be practiced otherwise than as specifically described herein.

I claim:

1. A split spacer for installation between the bearing surfaces of a fitting having a flange of one thickness and a flange connector configured to normally connect a flange of different thickness comprising;

at least two separate arcuate segments adapted to be releasably assembled and engaged end to end to form a flat disc-shaped ring having a predetermined inside and outside diameter and thickness and capable of being manually pulled apart, said segments dimensioned in their assembled ring configuration to be received on the bearing surface of the flange of one thickness and increase the thickness thereof such that their combined thickness will engage the bearing surface of the differently configured flange connector when connected thereon, whereby the fitting having a flange of one thickness may be connected in installations having a flange connector configured to normally connect flanges of a different thickness.

2. The split spacer according to claim 1 in which said segments are formed of a flat disc-shaped ring bisected along its diameter to form two separate identical semi-circular segments.

3. The split spacer according to claim 1 including elastic means on said segments for maintaining them in their engaged ring configuration such that they may be manually pulled apart and when released will assume the disc-shaped ring configuration.

4. The split spacer according to claim 3 in which said segments have an O-ring groove on their circumference, and said elastic means is an elastic O-ring installed in said groove.

5. The split spacer according to claim 1 in which said segments are magnetized such that their ends may be placed with the north pole of one segment adjacent the south pole of the opposed segment whereby said segments are normally maintained together in their engaged ring configuration by magnetic attraction such that they may be manually pulled apart and when released will assume the ring configuration.

6. The combination of a split spacer with a hose coupling having a flange of one size at one end and a bearing surface, said split spacer comprising;

at least two separate arcuate segments adapted to be releasably assembled and engaged end to end to form a flat disc-shaped ring having a predetermined inside and outside diameter and thickness and capable of being manually pulled apart, said segments dimensioned in their assembled ring configuration to be received on the bearing surface of the flange of one size to increase the thickness thereof such that their combined thickness will engage the bearing surface of a flange connector configured to normally engage a coupling having a flange of greater thickness than the flange of one size, whereby the hose coupling may be connected to other objects by a flange connector configured to normally engage a coupling having a flange of greater thickness than the flange of one size.

7. The combination according to claim 6 in which said segments are formed of a flat disc-shaped ring bisected along its diameter to form two separate identical semi-circular segments 8. The combination according to claim 6 including elastic means on said segments for maintaining them in their engaged ring configuration such that they may manually pulled apart and when released will assume the disc-shaped ring configuration.

9. The combination according to claim 8 in which said segments have an O-ring groove on their circumference, and said elastic means is an elastic O-ring installed in said groove.

10. The combination according to claim 6 in which said segments are magnetized such that their ends may be placed with the north pole of one segment adjacent the south pole of the opposed segment whereby said segments are normally maintained together in their engaged ring configuration by magnetic attraction such that they may be manually pulled apart and when released will assume the ring configuration.

11. A repair kit for connecting a hose coupling having a flange of one size at one end and a bearing surface to other objects with a flange connector having a bearing surface configured to normally engage a flange of greater thickness than the coupling flange, comprising in combination;

at least two separate arcuate segments adapted to be releasably assembled and engaged end to end to form a flat disc-shaped ring having a predetermined inside and outside diameter and thickness and capable of being manually pulled apart, said segments dimensioned in their assembled ring configuration to be received on the bearing surface of the flange of one size and increase the thickness thereof such that the combined thickness will engage the bearing surface of a flange connector configured to normally engage a coupling having a flange of greater thickness than the flange of one size.

12. The repair kit according to claim 11 in which said segments are formed of a flat disc-shaped ring bisected along its diameter to form two separate identical semi-circular segments.

13. The repair kit according to claim 11 including elastic means for installation on said segments for maintaining them in their engaged ring configuration such that they may be manually pulled apart to be installed on said flange of one size and when released will assume the disc-shaped ring configuration on its bearing surface.

14. The repair kit according to claim 13 in which said segments have an O-ring groove on their circumference, and said elastic means is an elastic O-ring installed in said groove.

15. The repair kit according to claim 11 in which said segments are magnetized such that their ends may be placed with the north pole of one segment adjacent the south pole of the opposed segment whereby said segments are normally together in their engaged ring configuration by magnetic attraction such that they may be manually pulled apart to be installed on said flange of one size and when released will assume the ring configuration on its bearing surface.

16. The repair kit according to claim 11 in which
said coupling flange of one size has an O-ring groove on its face, and including
an O-ring for installation in the O-ring groove of said coupling flange.

17. The repair kit according to claim 11 including
a set of washers for installation between an existing connector flange and the heads of existing connector flange bolts.

18. The repair kit according to claim 11 including
a set of bolts for installation in the bolt holes of an existing connector flange.

19. The repair kit according to claim 11 including
a split flange connector comprising a pair of generally flat disc-like independent sectors each having a central aperture and bolt holes circumferentially disposed about the central aperture and a counterbore defining an internal bearing shoulder for receiving said flange of one size and engaging said split spacer installed thereon.

20. The repair kit according to claim 19 including
a set of bolts for installation in the bolt holes of said split flange connector, and
a set of washers for installation between said split flange connector flange and the heads of the existing connector flange bolts.

* * * * *